US012803334B2

(12) United States Patent
Cheon et al.

(10) Patent No.: US 12,803,334 B2
(45) Date of Patent: Nov. 17, 2026

(54) WIRELESS CHARGING OF AN ELECTRONIC DEVICE

(71) Applicant: SAMSUNG ELECTRONICS CO., LTD., Suwon-si (KR)

(72) Inventors: Youso Cheon, Suwon-si (KR); Donghyuk Choi, Suwon-si (KR); Sanghee Kang, Suwon-si (KR); Woojin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 698 days.

(21) Appl. No.: 18/320,645

(22) Filed: May 19, 2023

(65) Prior Publication Data

US 2023/0387724 A1 Nov. 30, 2023

(30) Foreign Application Priority Data

May 24, 2022 (KR) ........................ 10-2022-0063701
Jul. 18, 2022 (KR) ........................ 10-2022-0088578

(51) Int. Cl.
*H02J 50/12* (2016.01)
*H02J 7/34* (2006.01)
(Continued)

(52) U.S. Cl.
CPC .............. *H02J 50/12* (2016.02); *H02J 7/342* (2020.01); *H02J 7/947* (2026.01); *H02J 50/20* (2016.02); *H02J 50/80* (2016.02); *H02J 50/90* (2016.02)

(58) Field of Classification Search
CPC .. H02J 50/12; H02J 50/80; H02J 50/20; H02J 7/342; H02J 7/947; H02J 50/90
(Continued)

(56) References Cited

U.S. PATENT DOCUMENTS 7,385,357 B2 * 6/2008 Kuennen ................. H02J 50/80 315/276
7,791,311 B2 9/2010 Sagoo
(Continued)

FOREIGN PATENT DOCUMENTS

EP 3439135 2/2019
EP 3890142 10/2021
(Continued)

OTHER PUBLICATIONS

EESR Dated Oct. 18, 2023 In Corresponding Appln. No. EP Patent Application No. 23173752.9.

*Primary Examiner* — Suresh Memula
(74) *Attorney, Agent, or Firm* — Morgan, Lewis & Bockius LLP

(57) ABSTRACT

A method for wirelessly charging an electronic device includes entering, by a first electronic device a wireless charging mode upon determining that a second electronic device is accessing the first electronic device; the first electronic device setting a power transmission duty ratio of the first electronic device at a first level; the first electronic device wirelessly supplying power to the second electronic device at the power transmission duty ratio; the first electronic device monitoring a current value of the first electric device used to provide the power to the second electronic device; and the first electronic device controlling the power transmission duty ratio according to the monitored current value.

20 Claims, 10 Drawing Sheets

(51) Int. Cl.
*H02J 7/94* (2026.01)
*H02J 50/20* (2016.01)
*H02J 50/80* (2016.01)
*H02J 50/90* (2016.01)

(58) Field of Classification Search
USPC .......... 320/108
See application file for complete search history.

(56) References Cited

U.S. PATENT DOCUMENTS 9,893,568 B2 2/2018 Watanabe et al.
10,978,899 B2 4/2021 Qiu et al.
11,050,307 B1 * 6/2021 Qiu .......... H02J 50/10
11,637,452 B2 * 4/2023 Danilovic .......... H02J 50/12 320/108
11,652,371 B2 * 5/2023 Park .......... H02J 50/60 320/108
11,670,968 B2 * 6/2023 Lee .......... H02J 50/10 320/108
11,677,332 B2 * 6/2023 Mao .......... H02M 7/537 320/108
11,707,996 B2 * 7/2023 Waters .......... B60L 53/12 320/108
11,735,957 B2 * 8/2023 Van Uden .......... H02M 3/01 320/108
2002/0084772 A1 * 7/2002 Ruha .......... H01M 10/44 320/162
2009/0174263 A1 * 7/2009 Baarman .......... H02J 50/12 307/104
2010/0181961 A1 * 7/2010 Novak .......... H02J 7/42 320/108
2012/0146576 A1 * 6/2012 Partovi .......... H01F 7/0252 320/108
2012/0306433 A1 * 12/2012 Kim .......... B60L 53/36 307/104
2013/0154556 A1 * 6/2013 Takahashi .......... H02M 3/156 320/108
2013/0221915 A1 * 8/2013 Son .......... H02J 7/50 320/108
2014/0375256 A1 * 12/2014 Lee .......... H02J 50/12 320/108
2015/0008876 A1 * 1/2015 Kwak .......... H02J 50/10 320/108
2015/0061578 A1 * 3/2015 Keeling .......... B60L 53/122 320/108
2015/0200563 A1 * 7/2015 Zhang .......... H02J 7/65 320/108
2016/0079796 A1 * 3/2016 Jeong .......... H02J 7/50 320/108
2016/0094074 A1 * 3/2016 Alves .......... H02J 50/12 320/108
2016/0197489 A1 * 7/2016 Kurs .......... H01F 38/14 320/108
2016/0355095 A1 12/2016 Okamoto
2019/0089171 A1 * 3/2019 Fischer .......... H02J 50/12
2020/0266674 A1 8/2020 Lee et al.
2021/0237602 A1 * 8/2021 Wang .......... H02J 50/40
2022/0077706 A1 3/2022 Sim et al.
2023/0121595 A1 * 4/2023 Ekström .......... H02J 7/54 320/108
2023/0163632 A1 * 5/2023 Partovi .......... H02J 50/10 320/108
2023/0163635 A1 * 5/2023 Kim .......... H02J 50/12 320/108
2023/0198318 A1 * 6/2023 Choi .......... H02J 50/80 320/108
2023/0208194 A1 * 6/2023 Lee .......... H02J 50/10 320/108
2023/0208204 A1 * 6/2023 Park .......... H02J 50/60 320/108
2023/0246483 A1 * 8/2023 Park .......... H04L 67/34 320/108
2023/0246484 A1 * 8/2023 Park .......... H02J 50/12 320/108

FOREIGN PATENT DOCUMENTS

JP 2004015521 1/2004
KR 10-0736053 6/2007
KR 10-1622694 5/2016
KR 10-1736160 5/2017
KR 10-2154779 9/2020
KR 10-2301103 9/2021

* cited by examiner

WIRELESS CHARGING OF AN ELECTRONIC DEVICE

CROSS-REFERENCE TO RELATED APPLICATIONS

This U.S. non-provisional patent application claims priority under 35 U.S.C. § 119 to Korean Patent Application Nos. 10-2022-0063701 and 10-2022-0088578, filed on May 24, 2022 and Jul. 18, 2022, respectively, in the Korean Intellectual Property Office, the disclosures of which are incorporated by reference in their entireties herein.

1. TECHNICAL FIELD

The inventive concept relates to wireless charging of an electronic device.

2. DISCUSSION OF RELATED ART

Electronic devices, such as smartphones and tablet personal computers (PCs), are powered by rechargeable batteries. Electrical energy may be supplied to the rechargeable batteries connecting the electronic device via a wire cable to a separate charging device to charge the batteries. However, it is difficult to use this charging method outdoors, and a user may be greatly burdened by having to carry a wired cable.

Wireless charging or contactless charging allows the batteries in electronic devices to be charged without use of a wired cable. The wireless charging technology uses wireless power transmission and reception. For example, during wireless charging, batteries in an electronic system are automatically charged without connection by separate charging connectors. The wireless charging technology may enable an electronic device to have increased water-resistance, and may increase the portability of electronic devices because wired chargers are not needed.

SUMMARY

At least one embodiment the inventive concept provides an electronic device and a method of controlling an electronic device, which are capable of preventing damage to a battery of the electronic device due to an inrush current generated when a battery sharing function starts.

Embodiments of the inventive concept also provide an electronic device, a method of controlling an electronic device, and a non-transitory computer-readable medium.

According to an embodiment of the inventive concept, a method for wirelessly charging an electronic device includes: entering, by a first electronic device entering a wireless charging mode upon determining that a second electronic device is accessing the first electronic device; the first electronic device setting a power transmission duty ratio of the first electronic device at a first level; the first electronic device wirelessly supplying power to the second electronic device at the power transmission duty ratio; the first electronic device monitoring a current value of the first electric device used to provide the power to the second electronic device; and the first electronic device controlling the power transmission duty ratio according to the monitored current value.

According to an embodiment of the inventive concept, there is provided an electronic device configured to wirelessly transmit power to an external electronic device. The electronic device includes a power source, a transmission coil, a full bridge circuit electrically connected to the power source and the transmission coil, a controller configured to communicate with the external electronic device via the transmission coil, and transmit a power signal via the transmission coil by controlling the full bridge circuit, and a current sensor configured to sense a current flowing through the full bridge circuit. The controller is configured enter a first operation mode to control the first bridge circuit to wirelessly provide the power signal to the external device at a power transmission duty ratio of a first level upon determining that the external electronic device is accessing the electronic device at a first time. The controller is configured to increase the power transmission duty ratio of the power signal to a second level higher than the first level at a second time after the first time and then enter a second operation mode.

According to an embodiment of the inventive concept, there is provided a non-transitory computer-readable medium storing code for wirelessly charging an electronic device. The code includes instructions executable by a processor to: enter a wireless charging mode upon determining that the electronic device desires to be charged; set a power transmission duty ratio to a first level; wirelessly supply a power signal to the electronic device at the power transmission duty ratio; monitor a current value of a current used to provide the power signal; and control the power transmission duty ratio according to the monitored current value.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
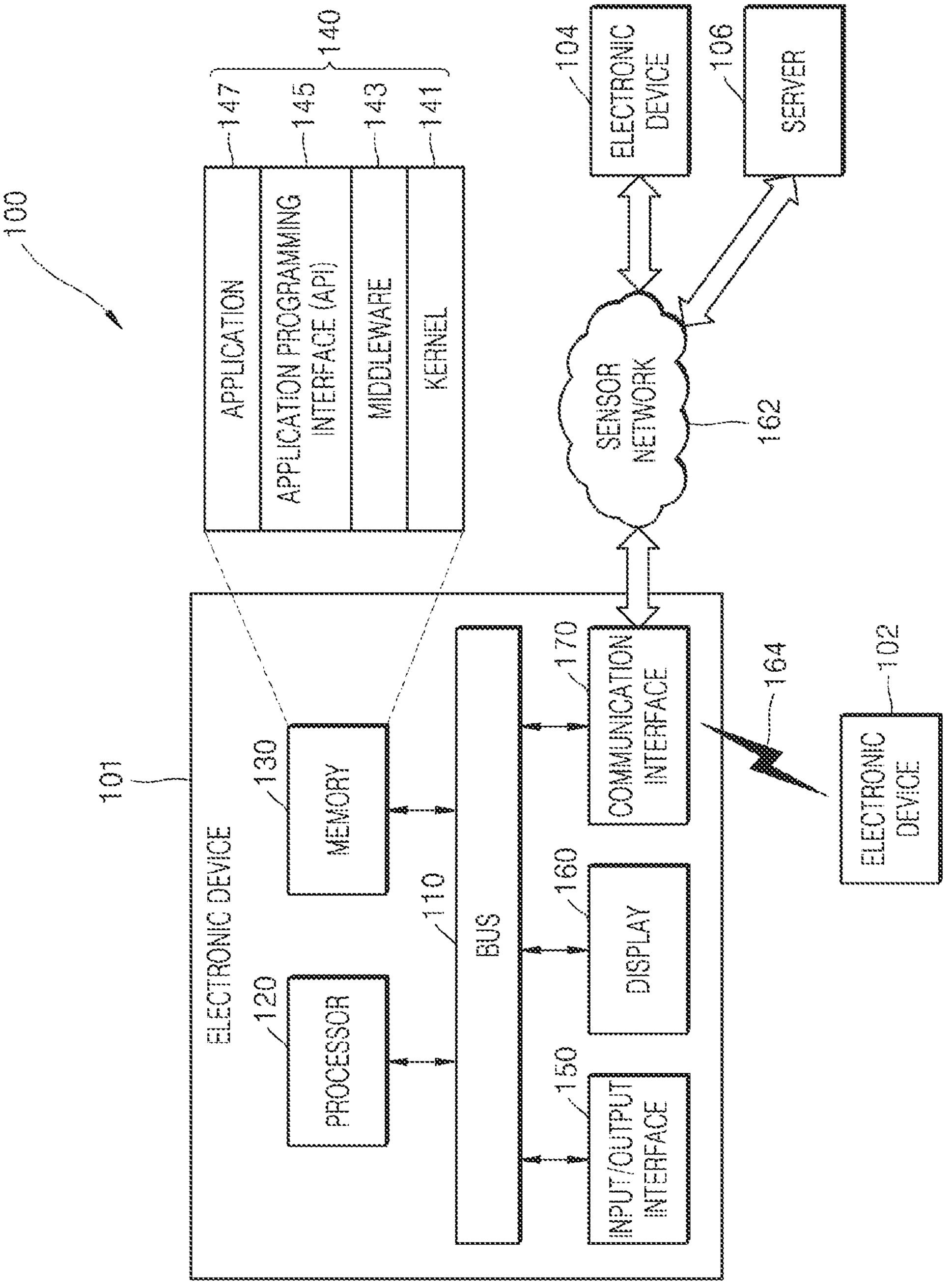
FIG. 1 is a block diagram illustrating a network environment including electronic devices according to an embodiment.

Hereinafter, various embodiments will be described with reference to the accompanying drawings. It should be understood, however, that there is no intent to limit embodiments to the particular forms, but on the contrary, the embodiments are to cover various modifications, equivalents, and/or alternatives falling within the scope of the inventive concept.

Like reference numerals refer to like elements throughout the description of the drawings.

As used herein, the expressions, such as "A or B," "at least one of A or/and B," or "one or more of A or/and B," may include all possible combinations of items listed together. For example, "A or B," "at least one of A and B," or "at least one of A or B" may refer to all cases including at least one A, at least one B, or both at least one A and at least one B.

The terms "first," "second," and the like used in various embodiments may modify various elements regardless of order and/or importance thereof, and do not limit the corresponding elements. These terms may be used to distinguish one element from another element. For example, a first user device and a second user device may refer to different user devices regardless of order or importance thereof. For example, a first element may be termed a second element, and similarly, the second element may be termed the first element without departing from the scope of the inventive concept.

It will be understood that when an element (e.g., a first element) is referred to as being "(operatively or communicatively) coupled with/to" or "connected to" to another element (e.g., a second element), the element may be directly coupled or connected to the other element or an intervening element (e.g., a third element) may be present. On the contrary, it will be understood that when an element (e.g., a first element) is referred to as being "directly coupled with/to" or "directly connected to" to another element (e.g., a second element), an intervening element (e.g., a third element) may not be present.

The expression "configured to (or set to)~" used herein may be interchangeably used with, for example, "suitable for ~," "having the capacity to ~," "designed to ~," "adapted to ~," "made to ~," or "capable of ~" according to the situation. The term "configured (or set) to ~" may not necessarily mean only "specifically designed to ~" in terms of hardware. Instead, in some situations, the expression "a device configured to ~" may mean that the device may "capable of ~" with other devices or components. For example, the phrase "a processor configured (or set up) to perform A, B, and C" may refer to a dedicated processor (e.g., an embedded processor) for performing a corresponding operation, or a generic-purpose processor (e.g., a CPU or an application processor) capable of performing corresponding operations by executing one or more software programs stored in a memory device.

The terminology used herein is for the purpose of describing particular embodiments only and may not be intended to limit the scope of the other embodiments. The singular forms are intended to include the plural forms as well, unless the context clearly indicates otherwise. Unless otherwise defined, all terms (including technical and scientific terms) used herein have the same meaning as commonly understood by one of ordinary skill in the art to which embodiments belong.

An electronic device according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device (e.g., smart glasses or a head-mounted device (HMD)), electronic clothes, an electronic bracelet, an electronic necklace, an electronic accessory, an electronic tattoo, a smart mirror, and a smart watch.

In some embodiments, the electronic device may be a smart home appliance. The smart home appliance may include at least one of, for example, a television, a digital video disk (DVD) player, an audio player, a refrigerator, an air conditioner, a vacuum cleaner, an oven, a microwave, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

In some embodiments, the electronic device may include at least one of various types of medical devices (e.g., various types of portable medical measurement devices (a blood glucose meter, a heart rate meter, a blood pressure meter, a body temperature meter, and the like), a magnetic resonance angiography (MRA) machine, a magnetic resonance imaging (MRI) machine, a computed tomography (CT) machine, a photographing device, an ultrasonic device, and the like), a navigation device, a global positioning system (GPS) receiver, an event data recorder (EDR), a flight data recorder (FDR), a vehicle infotainment device, marine electronic equipment (e.g., a navigation system for ships, a gyro compass, and the like), avionics, a security device, a vehicle head unit, an industrial or household robot, an automatic teller's machine (ATM) of a financial institution, a point of sales (POS) of a store, and the Internet of Things (IoT) (e.g., a light bulb, various types of sensors, an electricity or gas meter, a sprinkler system, a fire alarm, a thermostat, street lights, a toaster, exercise equipment, a hot water tank, a heater, a boiler, and the like).

According to some embodiments, the electronic device may include at least one of a portion of furniture or a building/structure, an electronic board, an electronic signature receiving device, a projector, and various types of measurement devices (e.g., a water, electricity, gas, or radio measurement device and the like). In various embodiments, the electronic device may be a combination of one or more of various types of devices as described above. The electronic device according to some embodiments may be a flexible electronic device. Also, the electronic device according to an embodiment is not limited to the aforementioned devices, and may include a new electronic device according to technological development.

Referring to FIG. 1, a network environment 100 may include an electronic device 101 according to various embodiments. The electronic device 101 may include a bus 110, a processor 120, a memory 130, an input/output (I/O) interface 150 (e.g., I/O interface circuit), a display 160, and a communication interface 170 (e.g., a transceiver). In some embodiments, the electronic device 101 may omit at least one of the elements, or may additionally include another element.

The bus 110 may include, for example, a circuit that connects the elements (the processor 120, the memory 130, the input/output interface 150, the display 160, and the communication interface 170) to one another and performs communication (e.g., transmits a control message and/or data) between the elements (the processor 120, the memory 130, the input/output interface 150, the display 160, and the communication interface 170).

The processor 120 may include one or more of a central processing unit (CPU), an application processor (AP), and a communication processor (CP). The processor 120 may perform, for example, operations or data processing related to control and/or communication of at least one other element of the electronic device 101.

The processor 120 may be referred to as a controller, or may include the controller as a portion thereof. The processor 120 according to various embodiments may include the memory 130 for storing information needed by the processor 120. The controller may control, as a CPU, the overall operation of the electronic device 101, and may perform an operation according to a control method for sharing power via wireless charging according to an embodiment. According to an embodiment, the controller may stably drive the electronic device 101 by controlling a power transmission duty ratio applied at a point in time when the electronic device 101 starts wireless charging with another electronic device 102 or 104.

According to an embodiment, the controller may drive the communication interface 170 to find an electronic device to share power with as a charging management application is executed. Accordingly, via the communication interface 170, the controller may search for peripheral electronic devices capable of receiving power, on the basis of a short-range wireless communication method, and may control information regarding at least one found electronic device to be displayed on the display 160. Therefore, the electronic device 102, which is a power receiver side to be charged, may be searched for on the basis of the short-range wireless communication method, and the electronic device 101 may transmit power to the electronic device 102 adjacent thereto to share power therewith. Here, a discovery operation of finding a peripheral electronic device by the short-range wireless communication method may be performed, and information regarding at least one electronic device, which is searched for via the discovery operation, e.g., an identification ID and the like, may be identified.

Accordingly, objects corresponding to each of the at least one found electronic device may be displayed on the display 160, and the objects may be expressed as various types of visual objects, such as icons, photos, text, and images, representing the at least one electronic device.

When any one of the objects representing each of the at least one electronic device is selected, the controller may perform a connection with the selected electronic device. Subsequently, when the controller is connected to the selected electronic device, the controller may acquire power-related information of the connected electronic device by requesting the power-related information from the connected electronic device. Here, the power-related information may include at least one of identification information of a target to be charged, battery state information of the target to be charged, power consumption information according to an operation time of each application, and charging efficiency information. Accordingly, the controller may display, on the display 160, a power status of the connected electronic device to be charged, on the basis of the acquired power-related information.

According to an embodiment, the controller may display, on the display 160, a power status of a target to be charged, so that a user may identify an amount of power needed to perform a particular function by an electronic device to be charged. In addition, the controller may receive, as an input from the user via the input/output interface 150, an amount of power to charge the target to be charged. According to the input of the amount of power to charge, the controller may re-calculate a power status of the target to be charged, and may display the re-calculated power status on the display 160.

The memory 130 may include a volatile and/or nonvolatile memory. The memory 130 may store, for example, commands or data related to at least one other element of the electronic device 101. According to an embodiment, the memory 130 may store software and/or a program 140. The program 140 may include, for example, a kernel 141, middleware 143, an application programming interface (API) 145, and/or an application program (or "an application") 147. At least a portion of the kernel 141, the middleware 143, or the API 145 may be referred to as an operating system (OS).

The kernel 141 may control or manage, for example, system resources (e.g., the bus 110, the processor 120, the memory 130, and the like) used to execute operations or functions implemented in other programs (e.g., the middleware 143, the API 145, and the application program 147). In addition, the kernel 141 may provide an interface capable of controlling or managing the system resources by accessing individual elements of the electronic device 101 via the middleware 143, the API 145, or the application program 147.

The middleware 143 may, for example, mediate such that the API 145 or the application program 147 may communicate with the kernel 141 to exchange data therewith. In addition, the middleware 143 may control (e.g., may schedule or load-balance) task requests received from the application program 147 by using a method of assigning priority for using the system resources (e.g., the bus 110, the processor 120, the memory 130, and the like) of the electronic device 101 to at least one application of the application program 147.

The API 145 may be, for example, an interface via which the application 147 may control a function provided by the kernel 141 or the middleware 143, and may include, for example, at least one interface or function (e.g., a command) for file control, window control, image processing, text control, or the like.

According to various embodiments, the application 147 may include a short message service (SMS)/multimedia messaging service (MMS) application, an email application, a calendar application, an alarm application, a charging management application (e.g., an application for monitoring a power sharing state), and the like. In addition, the application 147 may be an application related to information exchange between the electronic device 101 and an external electronic device (e.g., the electronic device 102 or 104). The application related to the information exchange may include, for example, a notification relay application for transmitting particular information to the external electronic device, or a device management application for managing the external electronic device.

In addition, according to various embodiments, the application 147 may include an application designated according to an attribute of the external electronic device (e.g., the electronic device 104) (e.g., a type of electronic device). Also, the application 147 may include at least one of an application designated in the electronic device 101 or an application received from an external electronic device (e.g., a server 106, or the electronic device 102 or 104).

The input/output interface 150 may operate as, for example, an interface capable of transmitting, to other element(s) (the bus 110, the processor 120, the memory 130, and the program 140, or the display 160 and the communication interface 170) of the electronic device 101, a command or data input from a user or another external device. In addition, the input/output interface 150 may output, to the user or the other external device, commands or data received from the other element(s) (the bus 110, the processor 120, the memory 130, and the program 140, or the display 160 and the communication interface 170) of the electronic device 101.

The display 160 may include, for example, a liquid crystal display (LCD), a light-emitting diode (LED) display, an organic light-emitting diode (OLED) display, a micro-electromechanical systems (MEMS) display, or an electronic paper display. The display 160 may display, for example, various types of content (e.g., text, images, video, icons, symbols, and the like) to the user. The display 160 may include a touch screen, and may receive, for example, a touch, gesture, proximity, or hovering input using an electronic pen or a part of the user's body.

Also, according to an embodiment, the display 160 may display a screen according to execution of a charging management application under control of the controller. In addition, the display 160 may display a screen for guiding selection of a target to be charged, and, as the target to be charged is selected, may provide a function of visually displaying a charging execution state for the selected target to be charged, and the like. For example, when the charging management application is executed and charging starts, a charging execution state may be displayed on the display 160. The display 160 may be implemented as a touch screen.

According to an embodiment, when the user attempts to charge the electronic device 102 to share power while arranging the electronic device 102 in an incorrect charging location, guidance information, such as moving to a chargeable position and charging, may be output on the display 160. The guidance information may be provided to the user by displaying an image on the display 160, or via vibration, voice, or the like.

The communication interface 170 may establish, for example, communication between the electronic device 101 and an external device (e.g., the electronic device 102, the electronic device 104, or the server 106). For example, the communication interface 170 may be connected to a sensor network 162 via wireless communication or wired communication to communicate with the external device (e.g., the electronic device 104 or the server 106).

The wireless communication may use, for example, at least one of long term evolution (LTE) long term evolution-advanced (LTE-A), code division multiple access (CDMA), wideband CDMA (WCDMA), universal mobile telephone system (UMTS), wireless broadband (WiBro), and global system for mobile communications (GSM) as a cellular communication protocol. The wired communication may include, for example, at least one of a universal serial bus (USB), a high definition multimedia interface (HDMI), recommended standard 232 (RS-232), a plain old telephone service (POTS), and the like. The sensor network 162 may include a communication network, for example, at least one of a computer network (e.g., a local area network (LAN) or a wide area network (WAN)), the Internet, and a telephone network.

According to an embodiment, the electronic device 101 may use a short-range communication method, such as WiFi, Bluetooth, or the like, during scanning to share power with the electronic device 102 peripheral thereto. The electronic device 101 may find at least one neighboring electronic device by using the short-range wireless communication method, and may wirelessly share power with the at least one neighboring electronic device. Accordingly, the electronic device 101 and the electronic device 102 may further include charging modules for wireless power transmission, which are capable of wirelessly transmitting or receiving power or supporting both transmission and reception of power on the basis of the wireless charging method.

The charging module may operate to share power with the electronic device 102, and may operate on the basis of a wireless charging method to transmit power to the electronic device 102. The wireless charging method may largely include an electromagnetic induction method using a coil, a resonance method using resonance, a radio frequency (RF)/micro wave radiation method of converting electrical energy into microwaves and transferring the microwaves, a magnetic resonance coupling method, and the like, and the charging module may operate on the basis of any one of the methods mentioned above.

Each of the electronic device 102 and the electronic device 104 may be the same or different type of device as or than the electronic device 101. According to an embodiment, the server 106 may include one server or a group of servers.

According to various embodiments, all or some of operations executed by the electronic device 101 may be executed by one or a plurality of electronic devices (e.g., the electronic devices 102 and 104 or the server 106). According to an embodiment, when the electronic device 101 needs to perform a certain function or service automatically or by request, the electronic device 101 may request at least some functions associated with the function or service from another device (e.g., the electronic device 102 or 104, or the server 106), instead of or in addition to executing the function or the service by itself. The other electronic device (e.g., the electronic device 102 or 104, or the server 106) may execute the requested function or an additional function, and may transmit a result of the execution to the electronic device 101. The electronic device 101 may provide the requested function or service by processing the received result intactly or additionally. Accordingly, for example, cloud computing, distributed computing, or client-server computing technology may be used.

Figure 2:
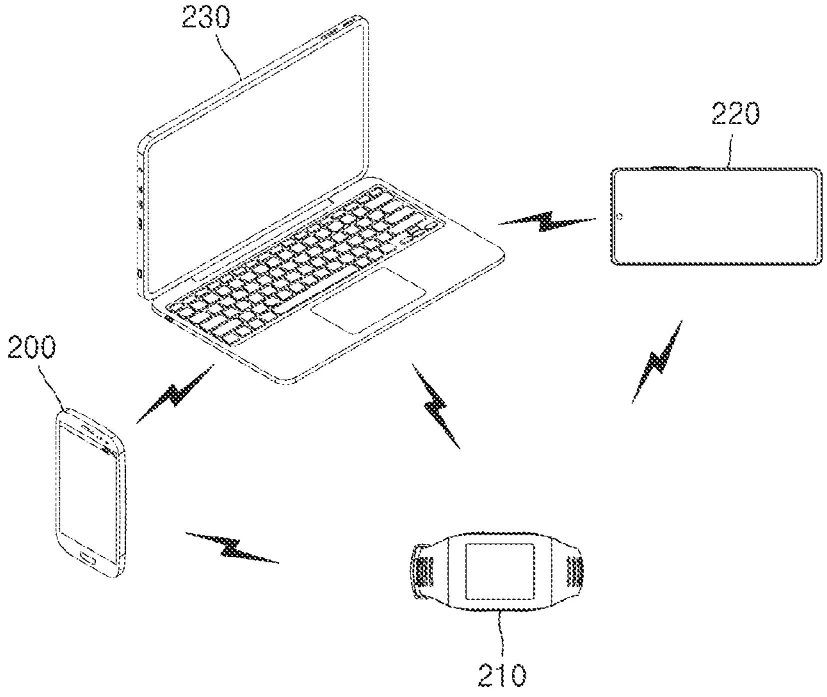
FIG. 2 is a view illustrating a method of sharing power between electronic devices, according to an embodiment.

FIG. 2 is a view illustrating a method of sharing power between electronic devices, according to various embodiments.

Referring to FIG. 2, electronic devices capable of sharing power may include a smartphone 200, a wrist-worn electronic device 210, a tablet PC 220, and a notebook computer 230. According to various embodiments, when at least one of the electronic devices 200, 210, 220, and 230 needs to be supplied with power during an application operation, an electronic device with sufficient power may supply power to the at least one electronic device. Here, an electronic device as a power receiving-side may be in a wireless transmission range of an electronic device as a power transmitting side, and may be wirelessly supplied with power from the power transmitting side-electronic device. According to some embodiments, a charging operation may be performed by placing another electronic device on a transmission (Tx) pad included in at least one of the electronic devices 200, 210, 220, and 230.

Accordingly, power may be shared between electronic devices without carrying accessories, such as a separate charger, an extra battery, and a charging cable, thereby improving the mobility of the electronic devices. In addition, according to various embodiments, any electronic device, which may share power without being limited by a battery type of the electronic device, such as a detachable type or an integrated type, may share power anytime and anywhere and may perform charging, thereby increasing the convenience of the user.

According to an embodiment, at least one of the electronic devices 200, 210, 220, and 230 may perform wireless charging with at least one other electronic device. However, capacitors respectively included in charging modules of the electronic devices 200, 210, 220, and 230 may have different capacities and the like, and thus, an inrush current may be generated when wireless charging is performed, thereby inducing power loss of an electronic device performing wireless charging. In an embodiment, controllers included in the electronic devices 200, 210, 220, and 230 may prevent power loss and shutdown of an electronic device performing wireless charging by controlling a power transmission duty ratio to control power from a low range when performing wireless charging. The detailed description thereof will be given below.

Figure 3:
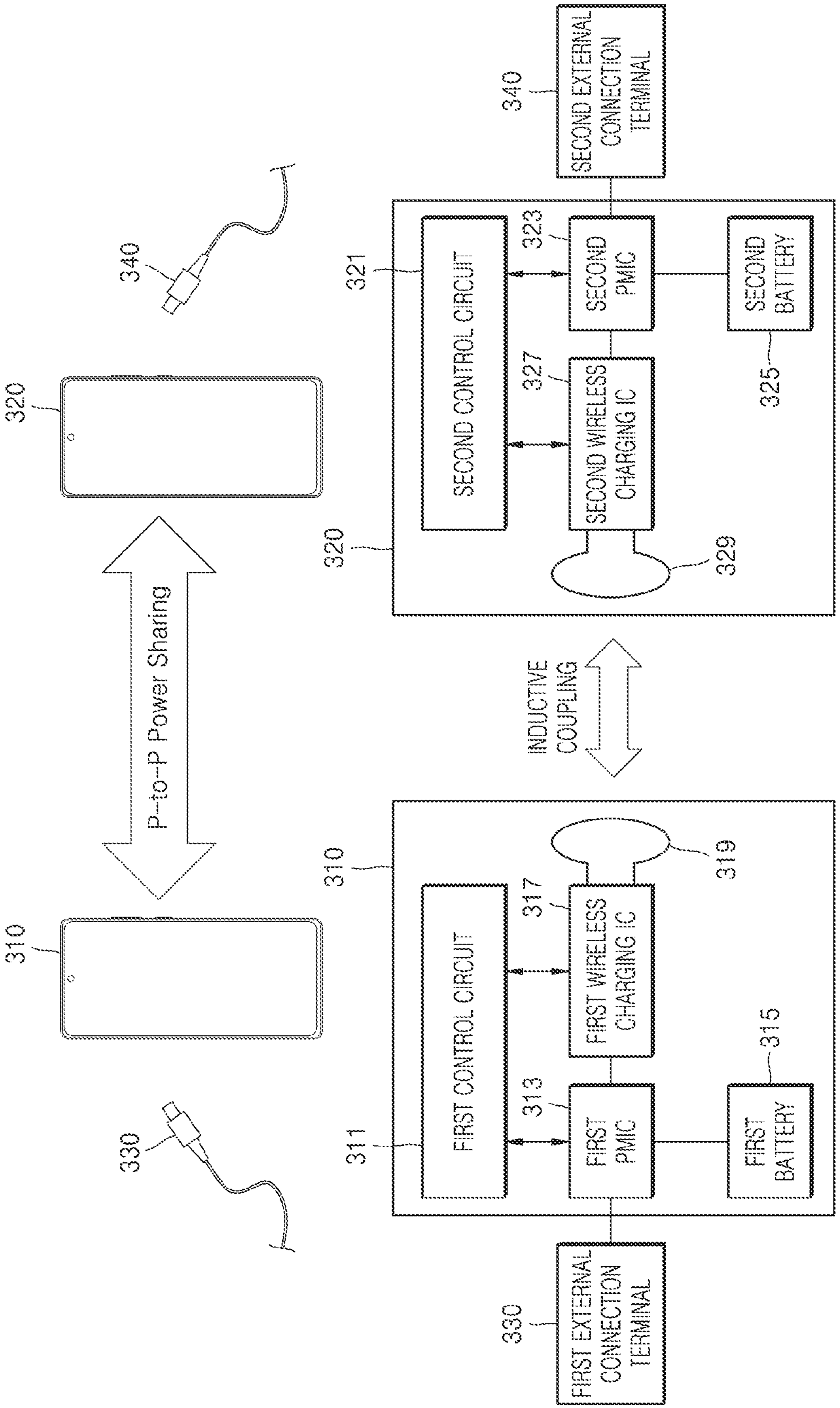
FIG. 3 is a conceptual diagram illustrating a wireless charging sharing function according to an embodiment.

FIG. 3 is a basic conceptual diagram illustrating a wireless charging sharing function according to an embodiment.

Referring to FIG. 3, both a first electronic device 310 (e.g., the electronic device 101 of FIG. 1) and a second electronic device 320 (e.g., the electronic device 102 of FIG. 1) are expressed as devices capable of performing wireless power transmission/reception, but one of the two electronic devices may be an electronic device capable of only wireless power reception. Here, the first electronic device 310 may be described as a reference electronic device, and the second electronic device 320 may be described as an external electronic device. The second electronic device 320 may have the same structure as the first electronic device 310, or may have a structure in which only a wireless power transmission function is removed.

According to an embodiment, the first electronic device 310 includes a first coil 319, a first wireless charging integrated circuit (IC) 317, a first power management IC (PMIC) 313, a first battery 315, a first external connection terminal 330 (e.g., a USB terminal) for a connection with a first external power supply device (or a wired charging device), and a first control circuit 311 (e.g., the processor 120 of FIG. 1). According to an embodiment, the second electronic device 320 includes a second coil 329, a second wireless charging IC 327, a second PMIC 323, a second battery 325, and a second control circuit 321. According to an embodiment, the second electronic device 320 further includes a second external connection terminal 340 (e.g., a USB terminal) for a connection with a second external power supply device (or a wired charging device). According to an embodiment, although the first electronic device 310 is mainly described herein, the elements of the first electronic device 310 and the second electronic device 320 may perform the same functions.

According to an embodiment, the first coil 319 has a spiral shape. According to an embodiment, the first wireless charging IC 317 includes a full bridge circuit. The first wireless charging IC 317 may be a rectifier or an inverter. For example, the first wireless charging IC 317 may control a full bridge circuit to operate as an inverter (e.g., DC→AC) in a wireless power transmission operation, and may control a full bridge circuit to operate as a rectifier (e.g., AC→DC) in a wireless power reception operation.

According to an embodiment, the first wireless charging IC 317 exchanges, according to the wireless power consortium (WPC) standard, pieces of information needed for wireless power transmission with the second electronic device 320 via an in-band communication. For example, the in-band communication may be a method capable of exchanging data between the first electronic device 310 and the second electronic device 320 via frequency or amplitude modulation of a wireless power transmission signal in a wireless power transmission situation between the first coil 319 and the second coil 329. According to an alternate embodiment, communication between the first electronic device 310 and the second electronic device 320 may occur using an out-band communication. For example, the out-band communication may be different from a wireless power signal, and may be short-range communication, such as near field communication (NFC), Bluetooth, or WiFi.

According to an embodiment, the first PMIC 313 includes a charger function for charging the first battery 315 with wired and wireless input power sources, a function of communicating (e.g., USB battery charging specification, USB power delivery (PD) communication, AFC communication, and/or quick charge (QC) communication) with an external power supply device (e.g., a travel adapter) connected to a USB terminal, a function of supplying needed power to a system and supplying each element with a power source appropriate for a voltage level needed for each element, and/or a function of supplying power to the first wireless charging IC 317 in a wireless power transmission mode.

According to an embodiment, the first external connection terminal 330 and the second external connection terminal 340 are terminals complying with a USB standard. For example, the first external connection terminal 330 and the second external connection terminal 340 may be interfaces for charging via a USB and/or supplying an on-the-go (OTG) power source. According to an embodiment, the first external connection terminal 330 and the second external connection terminal 340 may be connected to external power sources (TAs, battery packs, or the like).

According to an embodiment, the first control circuit 311 may integrally control functions of wired and wireless charging of the first electronic device 310, USB communication with the second electronic device 320, and/or communication (e.g., USB PD, BC1.2, AFC, and/or QC) with the second electronic device 320, according to a situation of the first electronic device 310. For example, the BC1.2, PD, or the like may be an interface for communicating with an external power source (a TA), and the first control circuit 311 may control communication with the external power source. For example, the situation of the first electronic device 310 may include a temperature of the first electronic device 310, and/or a capacity of the first battery 315 of the first electronic device 310. Here, the expression of a control circuit and the expression of a controller may be used interchangeably.

According to an embodiment, the first electronic device 310 operates in a wireless power Tx mode by using the first battery 315. Alternatively, when a wired power supply device is connected, the first electronic device 310 may primarily use an external power source in a Tx mode and charge the first battery 315 with the remaining power.

As used herein, an operation of an electronic device (e.g., the first electronic device 310 of FIG. 3) in a wireless power Tx mode may refer to a state in which the electronic device transmits wireless power to an external electronic device (e.g., the second electronic device 320 of FIG. 3) by using the first coil 319. Alternatively, an operation in the first electronic device 310 in a wireless power reception (Rx) mode may refer to a state in which the first electronic device 310 receives wireless power from an external electronic device (e.g., the second electronic device 320 of FIG. 3) via the first coil 319, and charges the first battery 315 by using the received wireless power.

The first control circuit 311 illustrated in FIG. 3 may be connected to the first PMIC 313 and the first wireless charging IC 317 to monitor, in real time, an amount of a current in the first electronic device 310 and control a power transmission duty ratio of power applied from the first electronic device 310. According to an embodiment, the first control circuit 311 may operate in a first operation mode or a second operation mode. The first operation mode may refer to an operation mode at a point in time when the first electronic device 310 starts wireless charging with the second electronic device 320, and the second operation mode may refer to an operation mode at a point in time when the first electronic device 310 starts wireless charging with the second electronic device 320, and then the first electronic device 310 and the second electronic device 320 start communicating with each other and charging is stabilized.

A control method according to the inventive concept may control a power transmission duty ratio applied at a point in time when wireless charging starts, such that the first electronic device 310 is not affected by an inrush current generated when the first electronic device 310 starts wireless charging with the second electronic device 320. Accordingly, the control method described in the inventive concept may be applied to a control method in a first operation mode of the first electronic device 310.

Figure 4:
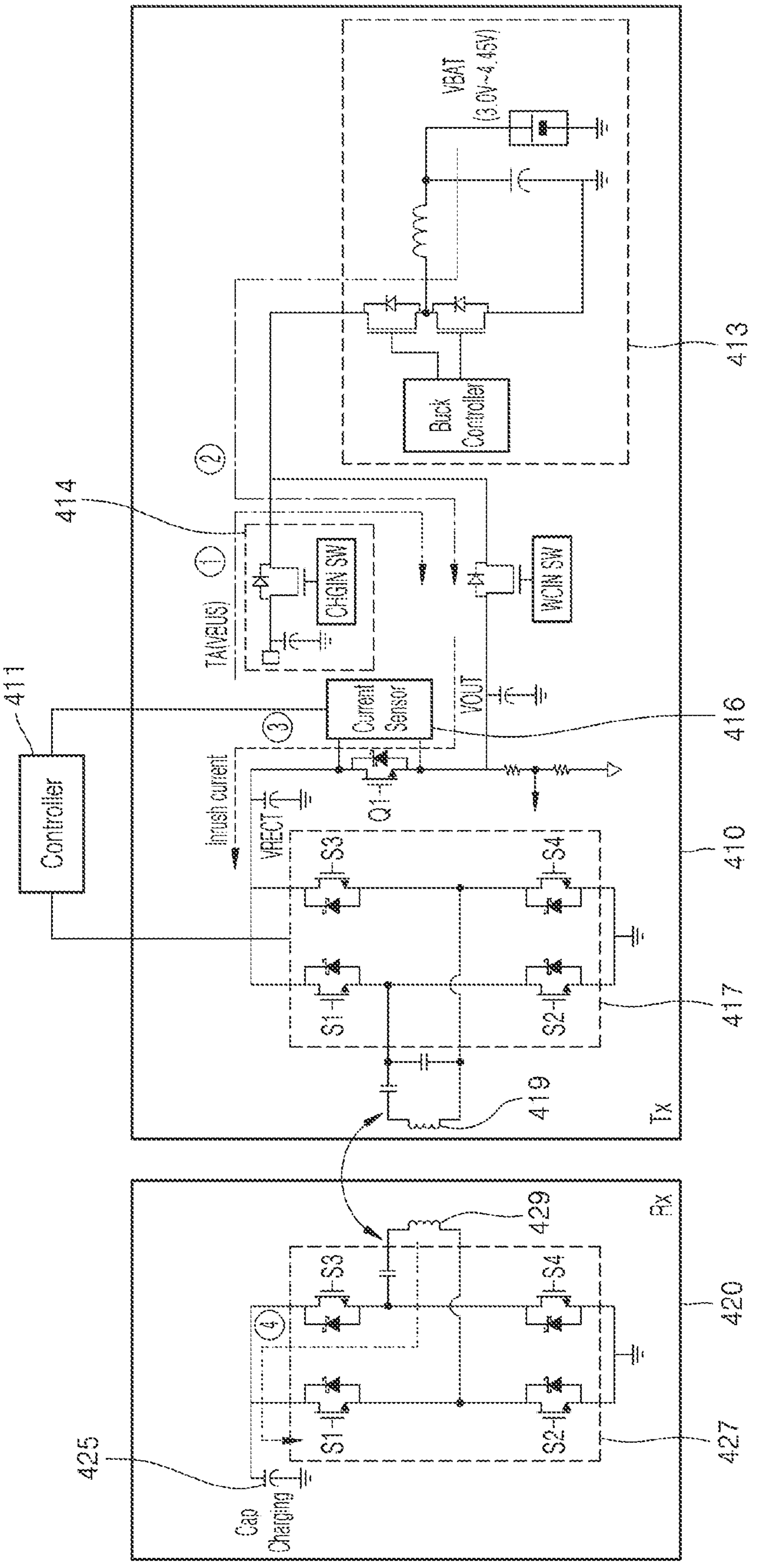
FIG. 4 illustrates circuit diagrams of a first electronic device and a second electronic device, according to an embodiment.

FIG. 4 illustrates circuit diagrams of a first electronic device and a second electronic device, according to an embodiment.

FIG. 4 illustrates a circuit diagram of a first electronic device 410 and a circuit diagram of a second electronic device 420. As shown in FIG. 4, the first electronic device 410 may operate in a wireless charging transmission mode, and the second electronic device 420 may operate in a wireless charging reception mode. The circuit diagram of the first electronic device 410 may be a circuit diagram capable of charging a counterpart terminal with wireless power to perform a battery sharing function.

The first electronic device 410 may include a TA 414 or an IF PMIC 413, a current sensor 416, a controller 411 (e.g., a control circuit), a full bridge circuit 417, and a transmission coil 419. The second electronic device 420 may include a full bridge circuit 427, a reception coil 429, and a battery 425. The circuit diagrams of the first electronic device 410 and the second electronic device 420 shown in FIG. 4 are only examples, and some of the elements of the circuit diagrams may be changed or omitted.

A wireless charging method will be briefly described with reference to the circuit diagram of the first electronic device 410 illustrated in FIG. 4.

The TA 414 or the IF PMIC 413 of the first electronic device 410 may be a power source. A boost power source may be generated as shown by ① and ②, by using the TA 414 or the IFPMIC 413. A power source VOUT, which is generated via the boost power source using the TA 414 or the IF PMIC 413, may fully turn on a transistor Q1 to conduct a terminal VRECT, as shown by ③. Accordingly, a DC power source may be supplied to one end of the full bridge circuit 417, and the controller 411 may control a signal applied to the full bridge circuit 417 by using the supplied DC power source. When AC power is supplied to an Rx terminal by inducing a current from the transmission coil 419 included in the first electronic device 410 to the reception coil 429 included in the second electronic device 420 via an induction method by using a voltage of the terminal VRECT, and a first switch S1, a second switch S2, a third switch S3, and a fourth switch S4 included in the full bridge circuit 417, a ping operation may be performed. Here, an input capacitor of the Rx terminal of the second electronic device 420 has no charges, and thus may perform a capacitor charging operation as indicated by shown with ④. A current needed for charging the capacitor may be intactly supplied to a Tx terminal of the first electronic device 410.

When the Rx terminal of the second electronic device 420 is raised while a battery sharing function of the first electronic device 410 is enabled, an operation of forming a path of a current of the full bridge circuit 427 of the Rx terminal via induced AC power and filling the empty input capacitor of the Rx terminal with charges via the current may be performed. Here, an inrush current may be instantaneously generated to initially charge the input capacitor of the Rx terminal. When a capacity of the input capacitor of the Rx terminal is large, an amount of a current generated may generate a larger amount of an inrush current, and the inrush current may directly induce a power loss in the Tx terminal performing the battery sharing function. An excessive inrush current generated in the Rx terminal may induce a large dropout in a boost converter output voltage of the IF PMIC 413 used to operate a battery sharing function in a terminal, the battery sharing function may be blocked due to an over current protection (OCP) operation, or a battery may be damaged.

The first electronic device 410 according to the inventive concept may minimize an inrush current generated in the Rx terminal when the battery sharing function is initially enabled, and the stability of the first electronic device 410 may be increased. Hereinafter, characteristic portions of the first electronic device 410 will be described in detail.

The current sensor 416 included in the first electronic device 410 may be connected in parallel to the transistor Q1. The current sensor 416 is not limited to an arrangement location illustrated in FIG. 4, and may be arranged at another location at which a current flowing in the first electronic device 410 may be sensed. The current sensor 416 may sense an input current value and transmit the sensed input current value to the controller 411. The input current value may be a value of a current input to the second electronic device 420. The input current value may be a value of a current generated by the first electronic device 410 and input to the second electronic device 420. The controller 411 may monitor the value of the current measured by the current sensor 416. The controller 411 may compare the value of the current measured by the current sensor 416 with a reference current value. The reference current value may be stored in the controller 411. The reference current value may refer to an over current value at which a wireless charging operation of the first electronic device 410 is blocked. According to an embodiment, the reference current value may be a reference current value for which the IF PMIC 413 included in the first electronic device 410 is subjected to OCP.

In a first operation mode in which wireless charging starts, the controller 411 may monitor in real time whether a value of a current flowing through the first electronic device 410 does not exceed the reference current value.

The full bridge circuit 417 included in the first electronic device 410 may include the first switch S1 electrically connected to one end of the transmission coil 419 and turned on in response to a first gate signal of the controller 411, the second switch S2 electrically connected to one end of the transmission coil 419 and turned on in response to a second gate signal of the controller 411, the third switch S3 electrically connected to the other end of the transmission coil 419 and turned on in response to a third gate signal of the controller 411, and the fourth switch S4 electrically connected to the other end of the transmission coil 419 and turned on in response to a fourth gate signal of the controller 411. For example, the controller 411 may provide the first gate signal to a gate of a first transistor used to implement the first switch S1, provide the second gate signal to a gate of a second transistor used to implement the second switch S2, provide the third gate signal to a gate of a third transistor used to implement the third switch S3 and provide the fourth gate signal to a gate of a fourth transistor used to implement the fourth switch S4. In the first operation mode, the controller 411 may control a power transmission duty ratio of the first electronic device 410 by shift-controlling switching timings of some of the first to fourth gate signals. According to an embodiment, the first electronic device 410 may adjust an amount of power transmitted to the second electronic device 420 by controlling a power transmission duty ratio of a wireless power transmission and reception module on the basis of power transmission-related information. When the power transmission duty ratio is 1, the first electronic device 410 may continuously transmit, to the second electronic device 420, wireless power according to a resonance frequency. When the power transmission duty ratio is 0.5, the first electronic device 410 may transmit wireless power according to the resonance frequency during a first time interval (e.g., a half period) within a given period, and may turn off power transmission during a second time interval (e.g., the remaining half period).

The controller 411 may control a power transmission duty ratio applied by the first electronic device 410 by controlling switching timings of control signals applied to the gates of the first to fourth switches S1 to S4 included in the full bridge circuit 417, and thus may determine whether or not a current flowing through the first electronic device 410 exceeds the reference current value. When the current does not reach the reference current value during control of the duty ratio, power may be controlled to be sequentially increased by additionally controlling the duty ratio. The detailed method thereof will be given below.

Figure 5A:
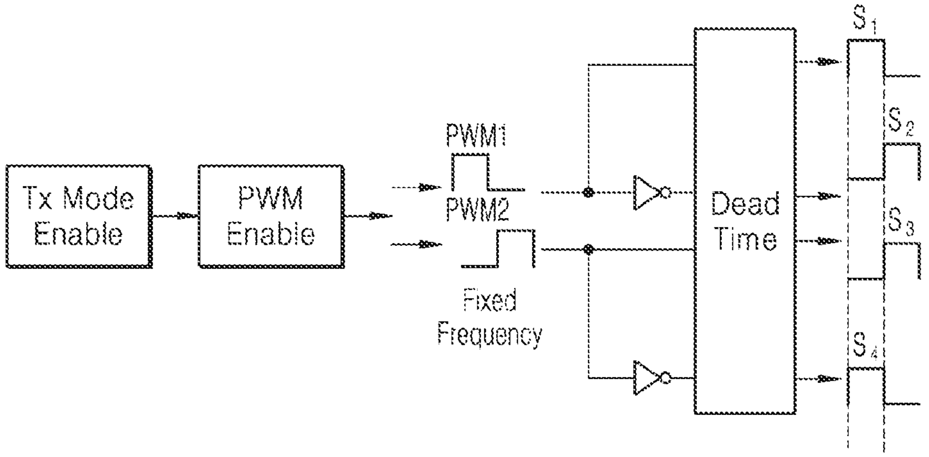
FIGS. 5A and 5B are block diagrams illustrating a method of controlling a duty ratio, according to an embodiment.
Figure 5B:
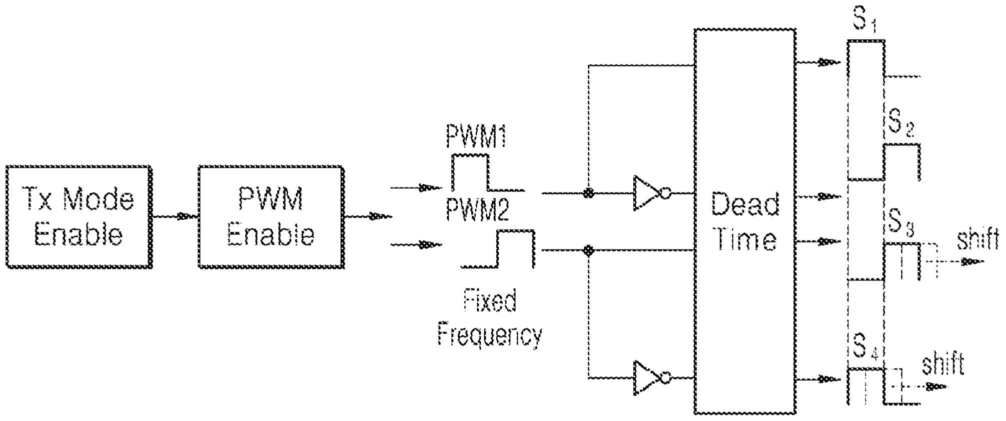

FIGS. 5A and 5B are block diagrams illustrating a method of controlling a duty ratio, according to embodiments.

FIGS. 5A and 5B are block diagrams illustrating embodiments in which the controller 411 generates and controls pulse signals to be applied to a full bridge circuit. FIGS. 5A and 5B may be diagrams for describing an operation of a full bridge circuit in a battery sharing mode. With reference to FIGS. 5A and 5B, common portions will be described first, and then differences will be described.

Referring to FIGS. 5A and 5B, when a battery sharing mode (a Tx mode) is enabled, a controller may control to generate a pulse width modulation (PWM) enable signal to drive a full bridge circuit. When the PWM enable signal is generated, a first PWM signal PWM1 and a second PWM signal PWM2 may be respectively generated. Phases of the first PWM signal PWM1 and the second PWM signal PWM2 may be opposite to each other. Frequencies of the first PWM signal PWM1 and the second PWM signal PWM2 may be the same and may have fixed values.

Referring to FIGS. 5A and 5B, a signal, which is output after the first PWM signal PWM1 passes through a dead time, may be a signal $S_1$ applied to a gate of the first switch S1, and a signal, which is output after the first PWM signal PWM1 passes through an inverter and a dead time, may be a signal $S_2$ applied to a gate of the second switch S2. Referring to FIGS. 5A and 5B, a signal, which is output after the second PWM signal PWM2 passes through the dead time, may be a signal S3 applied to a gate of the third switch S3, and a signal, which is output after the second PWM signal PWM2 passes through an inverter and a dead time, may be a signal $S_4$ applied to a gate of the fourth switch S4.

Referring to FIGS. 5A and 5B, the signal $S_1$ applied to the gate of the first switch S1 and the signal $S_2$ applied to the gate of second switch S2 may be out of phase with each other, and the signal $S_3$ applied to the gate of the third switch S3 and the signal $S_4$ applied to the gate of the fourth switch S4 may be out of phase with each other.

According to an embodiment, a ping power operation may be performed by controlling, via the first PWM signal PWM1 and the second PWM signal PWM2, gate signals respectively applied to the first switch S1, the second switch S2, the third switch S3, and the fourth switch S4 included in the full bridge circuit. Referring to FIGS. 5A and 5B, the signals $S_1$ and $S_4$ applied to the first switch S1 and the fourth switch S4 included in the full bridge circuit may be in phase with each other, and the signals $S_2$ and $S_3$ applied to the second switch S2 and the third switch S3 may be in phase with each other. The signal $S_1$ applied to the first switch S1, the signal $S_2$ applied to the second switch S2, the signal $S_3$ applied to the third switch S3, and the signal $S_4$ applied to the fourth switch S4, shown in FIGS. 5A and 5B, may be signals applied to the first, second, third, and fourth switches S1-S4 included in the full bridge circuit, respectively.

FIG. 5A is a block diagram for describing shift control according to an embodiment. Referring to FIG. 5A, the signal $S_1$ applied to the first switch S1 and the signal $S_4$ applied to the fourth switch S4 are in phase with each other, and the signal $S_2$ applied to the second switch S2 and the signal $S_3$ applied to the third switch S3 are in phase with each other. In other words, according to the shift control method according to the embodiment of FIG. 5A, a power transmission duty ratio of a first electronic device may be controlled to be a full duty. According to an embodiment, the full duty may refer to a duty ratio of 50%. According to the embodiment of FIG. 5A, when a ping operation is performed, driving of the full bridge circuit may be controlled at full duty, so that a current needed for input cap charging may be intactly supplied to a reception terminal of a second electronic device. In this case, an inrush current, which is generated when contacting the second electronic device, may not be coped with. The inrush current of the reception terminal of the second electronic device may generate an over current in a transmission terminal of the first electronic device in the same manner, and thus may induce an OCP operation of an IF PMIC, and damage to a battery.

FIG. 5B is a block diagram for describing execution of shift control according to an embodiment. FIG. 5B illustrates an example of shifting the signal $S_3$ applied to the third switch S3 and the signal $S_4$ applied to the fourth switch S4. Referring to FIG. 5B, the signal $S_3$ applied to the third switch S3 is shifted to the right, and the signal $S_4$ applied to the fourth switch S4 is also shifted to the right. Duty ratios of the signal $S_2$ applied to the second switch S2 and the signal $S_3$ applied to the third switch S3 may be controlled by shifting the signal $S_3$ applied to the third switch by a certain region. Duty ratios of the signal $S_1$ applied to the first switch and the signal $S_4$ applied to the fourth switch S4 may be controlled by shifting the signal $S_4$ applied to the fourth switch by a certain region. Referring to FIG. 5B, the signal $S_3$ applied to the third switch S3 and the signal $S_4$ applied to the fourth switch S4 may be shifted by the same amount, so that the duty ratios of the signals $S_1$ and $S_4$ applied to the first switch S1 and the fourth switch S4, respectively, may be equal to the duty ratios of the signals $S_2$ and $S_3$ applied to the second switch S2 and the third switch S3, respectively.

FIG. 5B illustrates an example of controlling to shift the signal $S_3$ applied to the third switch S3 and shift the signal $S_4$ applied to the fourth switch S4, but the inventive concept is not limited thereto. At least one of the signals $S_1$, $S_2$, $S_3$, and $S_4$ applied to the first, second, third, and fourth switches S1-S4 may be shifted to control the duty ratios of the signals $S_1$ and $S_4$ applied to the first switch S1 and the fourth switch S4, respectively, to be equal to the duty ratios of the signals $S_2$ and $S_3$ applied to the second switch S2 and the third switch S3, respectively.

Figure 6A:
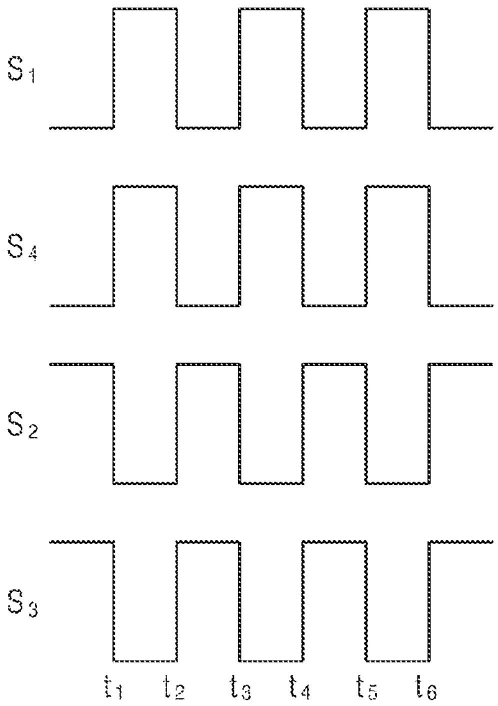
FIGS. 6A and 6C are timing diagrams illustrating embodiments for differently controlling a duty ratio.
Figure 6B:
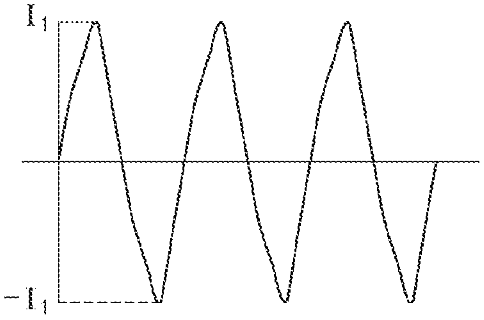
FIGS. 6B and 6D are graphs illustrating current output results according to FIGS. 6A and 6C, respectively.
Figure 6C:
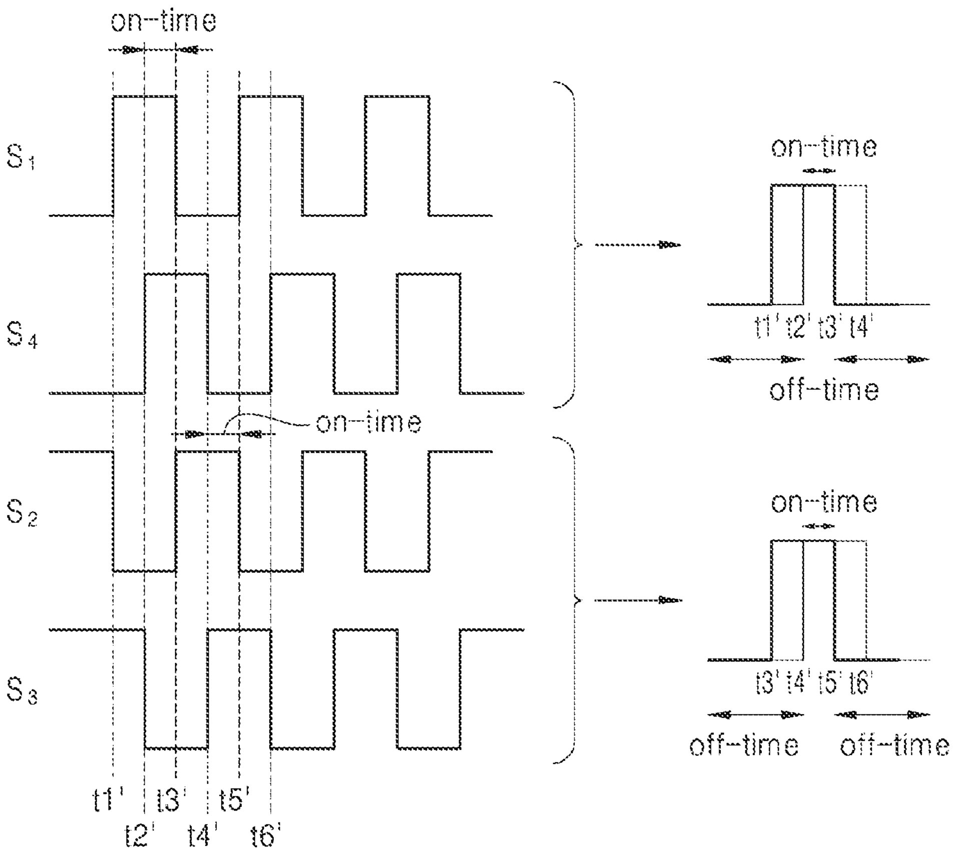
Figure 6D:
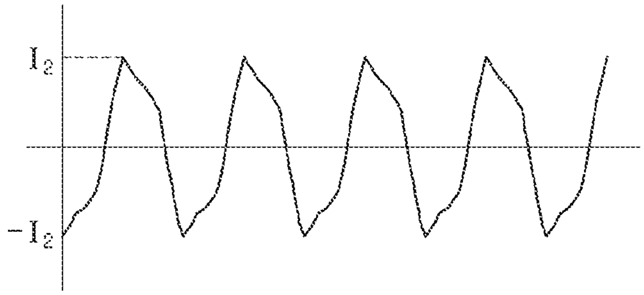

FIGS. 6A to 6D illustrate output comparison waveforms of a coil current under a condition in which duty ratios are differently controlled, according to embodiments. In more detail, FIGS. 6A and 6C illustrate timing diagrams of differently controlling duty ratios according to embodiments, and FIGS. 6B and 6D are graphs illustrating current output results according to FIGS. 6A and 6C, respectively.

FIG. 6A illustrates a timing diagram of controlling a duty ratio to 50% according to the embodiment of FIG. 5A, and FIG. 6C illustrates a timing diagram of controlling a duty ratio to 30% according to the embodiment of FIG. 5B.

FIG. 6A illustrates a timing diagram showing, in the form of pulse signals, signals applied to a first switch S1, a second switch S2, a third switch S3, and a fourth switch S4, respectively. Referring to FIG. 6A, at t1, the signal applied to the first switch S1 and the signal applied to the fourth switch S4 transition from a low level 0 to a high level 1, and the signal applied to the second switch S2 and the signal applied to the third switch S3 transition from the high level 1 to the low level 0. At t2, the signal applied to the first switch S1 and the signal applied to the fourth switch S4 transition from the high level 1 to the low level 0, and the signal applied to the second switch S2 and the signal applied to the third switch S3 transition from the low level 0 to the high level 1. Referring to FIG. 6A, both the signals applied to the first switch S1 and the fourth switch S4 are applied in the same phase, and both the signals applied to the second switch S2 and the third switch S3 are also applied in the same phase, and thus, the signals may each have a duty ratio of 50%.

FIG. 6B is a graph illustrating a current output when a signal is applied as illustrated in FIG. 6A. Referring to FIG. 6B, an input current in a transmission terminal may increase due to generation of an inrush current in a reception terminal Rx. Here, a measured current may have a width of $I_1$.

FIG. 6C illustrates a timing diagram showing, in the form of pulse signals, signals applied to a first switch S1, a second switch S2, a third switch S3, and a fourth switch S4, respectively, and a duty ratio according thereto. FIG. 6C illustrates an example in which the signal applied to the fourth switch S4 and the signal applied to the third switch S3 are respectively shifted.

Referring to FIG. 6C, at t1' the signal applied to the first switch S1 may transition from a low level to a high level. At t1', the signal applied to the fourth switch S4 may maintain the low level. At t2', the signal applied to the fourth switch S4 may transition from the low level to the high level. At t2', the signal applied to the first switch S1 may maintain the high level. At t3', the signal applied to the first switch S1 may transition from the high level to the low level. At t3', the signal applied to the fourth switch S4 may maintain the high level. At t4', the signal applied to the first switch S1 may maintain the low level. At t4', the signal applied to the fourth switch S4 may transition from the high level to the low level.

Referring to the right drawing of FIG. 6C, an on-time during which both the signal applied to the first switch S1 and the signal applied to the fourth switch S4 maintain the high level by shifting the signal applied to the fourth switch S4 may have a lower value, compared to the embodiment of FIG. 6A. Referring to FIG. 6C, only an interval from t2' to t3' may be an on-time during which both the signal applied to the first switch S1 and the signal applied to the fourth switch S4 maintain the high level, and the other intervals may be off-times.

A duration during which both the signal applied to the first switch S1 and the signal applied to the fourth switch S4 maintain the high level in the embodiment of FIG. 6A may be greater than a duration during which both the signal applied to the first switch S1 and the signal applied to the fourth switch S4 maintain the high level in the embodiment of FIG. 6C. In other words, the on-time of FIG. 6A may be from t1 to t2, whereas the on-time of FIG. 6C may be from t2' to t3'. As shown in FIG. 6C, a duty ratio may be adjusted via shift control, and thus, an on-time may be adjusted, thereby affecting a peak value of an output current. As a ratio of an on-time is high, a duty ratio may be high, and power may also have a high value proportionally.

FIG. 6D is a graph illustrating a current output when a signal is applied as illustrated in FIG. 6C. Referring to FIG. 6D, an inrush current in a reception terminal may be blocked by a pulse signal having a reduced duty ratio, and an input current in a transmission terminal may be significantly reduced. Here, a measured current may have a width of 12. Referring to FIGS. 6B and 6D, $I_1$ may have a value greater than $I_2$.

Referring to FIGS. 6A to 6D, as a duty ratio is lower, power that may be supplied to the transmission terminal Tx is limited, and thus, power that may be used in the reception terminal may be reduced. According to an embodiment of the inventive concept, an inrush current generated in a reception terminal may be controlled by supplying power while gradually increasing a duty ratio from a low value when an initial ping operation starts, i.e., at a point in time when a first electronic device contacts a second electronic device to start wireless charging. Via a control method according to the inventive concept, battery sharing may more stably start by controlling an inrush current generated in a Rx terminal during a ping operation in a first Tx mode. Referring to FIGS. 6A and 6B, when a duty ratio is controlled to a maximum duty ratio without being separately controlled, an inrush current may be generated to be greater than or equal to several amps. However, referring to FIGS. 6C and 6D, when a duty ratio is controlled, an internal current may be stably supplied by limiting an inrush current.

Figure 7A:
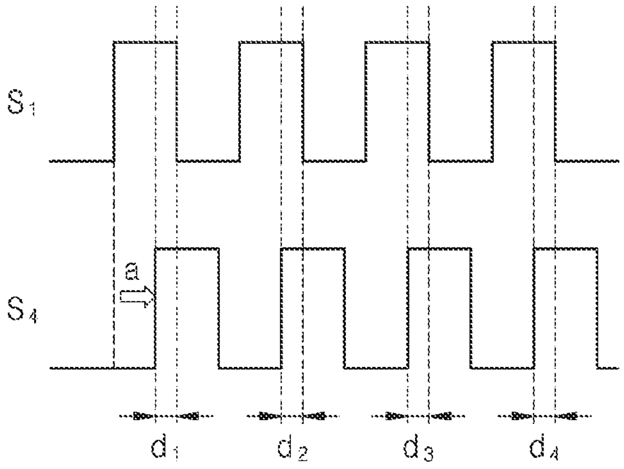
FIGS. 7A and 7B are timing diagrams illustrating embodiments for differently controlling a duty ratio by shifting a signal for operating a full bridge circuit.
Figure 7B:
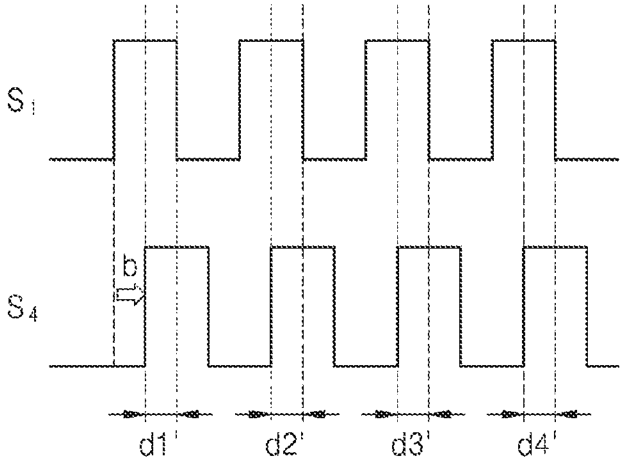

FIGS. 7A and 7B are timing diagrams illustrating embodiments for differently controlling a duty ratio by shifting a signal for operating a full bridge circuit.

For convenience of description, FIGS. 7A and 7B illustrate only signals applied to a first switch S1 and a fourth switch S4 included in a full bridge circuit. However, a shift control method illustrated in FIGS. 7A and 7B may also be equally applied to signals applied to a second switch S2 and a third switch S3 included in the full bridge circuit. According to an embodiment, a signal obtained by inverting the signal applied to the first switch S1 may be a signal applied to the second switch S2, and a signal obtained by inverting the signal applied to the third switch S3 may be a signal applied to the fourth switch S4.

FIG. 7A illustrates, in the form of a pulse, the signal applied to the first switch S1, and a result of shifting the signal applied to the fourth switch S4 by a.

Referring to FIG. 7A, due to the result of shifting by a, an on-time in one pulse cycle may correspond to a portion indicated by $d_1$. Referring to FIG. 7A, four pulse cycles are shown, and on-times in the pulse cycles may be $d_1$, $d_2$, $d_3$, and $d_4$, respectively. Here, a duty ratio may be obtained as in Equation 1 below.

$$\text{Duty ratio} = \frac{d1}{a + d1} * 100 \qquad \text{[Equation 1]}$$

Referring to FIG. 7B, due to a result of shifting by b, an on-time in one pulse cycle may correspond to a portion indicated by dr. Referring to FIG. 7B, four pulse cycles are shown, and on-times in the pulse cycles may be d1', d2', d3', d4', respectively. Here, a duty ratio may be obtained as in Equation 2 below.

$$\text{Duty ratio} = \frac{d1'}{b + d1'} * 100 \quad \text{[Equation 2]}$$

Referring to FIGS. 7A and 7B, the duty ratio of FIG. 7A may have a lower value than the duty ratio of FIG. 7B. As shown in FIG. 7A and FIG. 7B, a duty ratio may vary according to on how much a signal is shifted, and a peak value of an applied current may vary according to the varied duty ratio. A power transmission duty ratio of a first electronic device may be controlled by performing shift control by the method described above.

According to the inventive concept, a portion of a signal applied to control a duty ratio may be shifted without starting a full duty operation to apply a signal for an operation of a full bridge circuit. In addition, the duty ratio may be additionally controlled by monitoring a current flowing through a first electronic device at the beginning of a ping operation to prevent overcurrent from occurring. The detailed description thereof will be given with reference to the following flowcharts.

Figure 8:
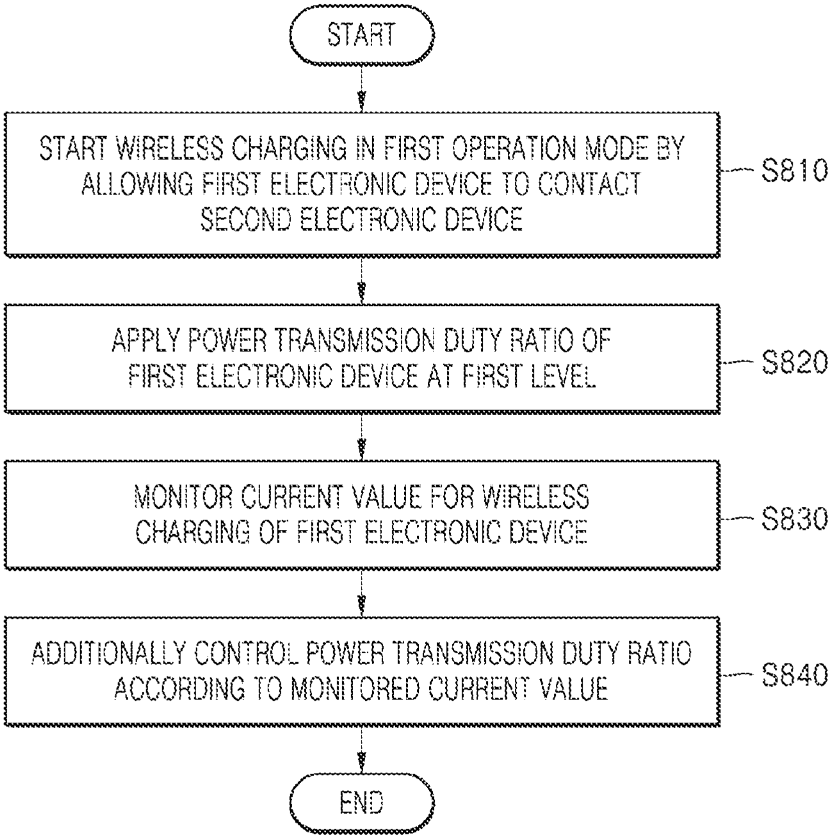
FIGS. 8 to 10 are flowcharts illustrating a method of controlling an electronic device, according to an embodiment.
Figure 9:
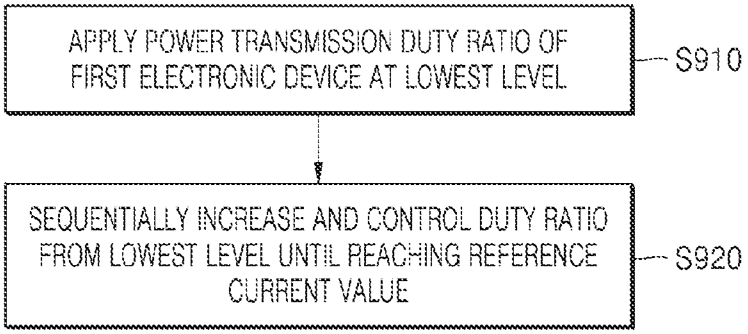
Figure 10:
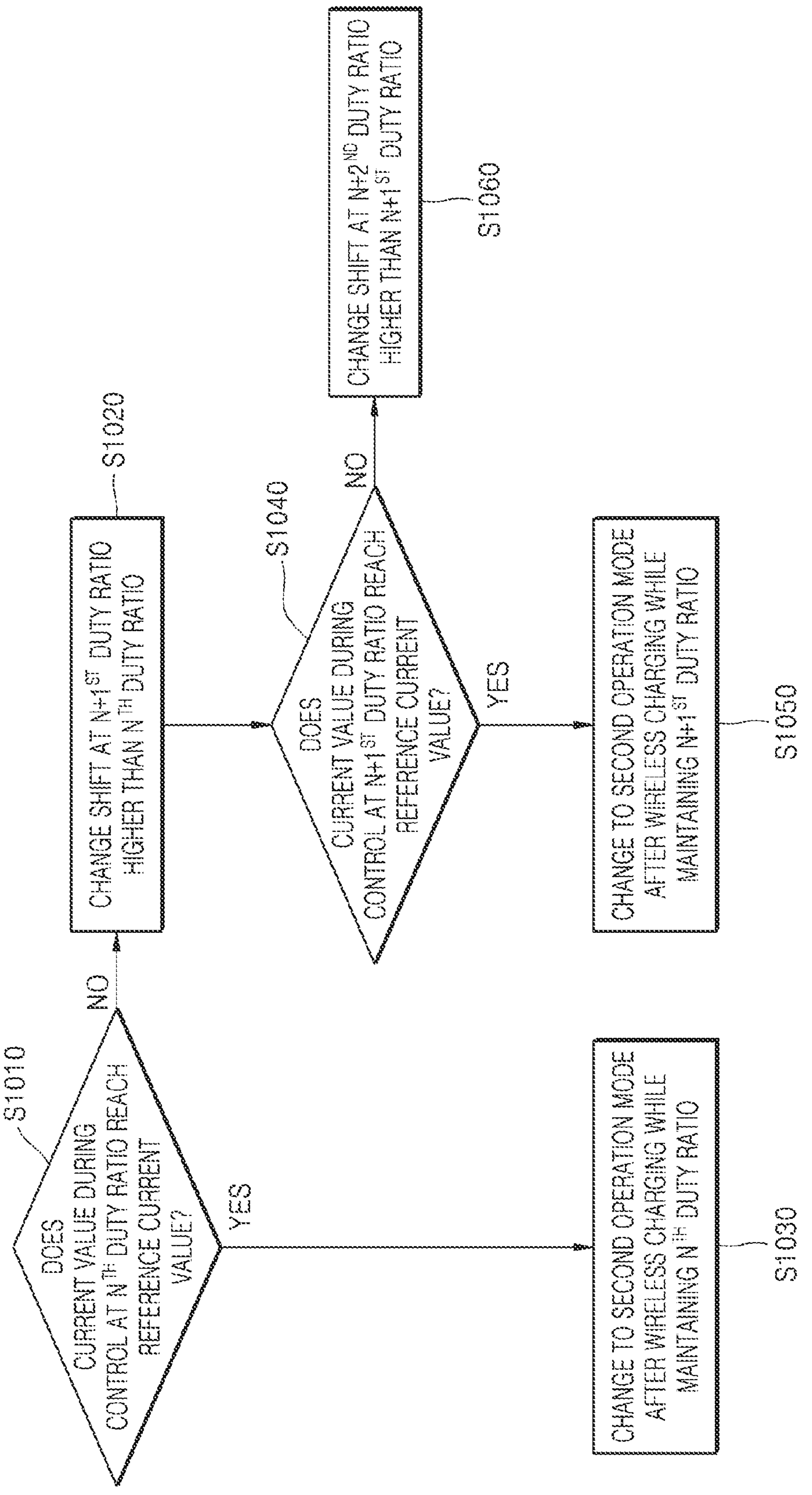

FIGS. 8 to 10 are flowcharts illustrating a method of controlling an electronic device, according to embodiments.

FIG. 8 illustrates a method of controlling an electronic device, according to an embodiment.

In operation S810, a first electronic device contacts a second electronic device to start wireless charging in a first operation mode. According to an embodiment, in operation S810, the first electronic device contacts the second electronic device to start wireless charging, but the contact at this time need not be limited to a physical contact. According to an embodiment, even though the first electronic device and the second electronic device are not in physical contact, the first electronic device and the second electronic device may start wireless charging when the first electronic device and the second electronic device are located within a particular distance. For example, the wireless charging may start once the distance between the first electronic device and the second electronic device is less than or equal the particular distance. The first electronic device being brought into contact with the second electronic device or within the particular distance from the second electronic device sufficient to start wireless charging from the second electronic device to the first electronic device may be referred to as the first electronic device accessing the second electronic device. According to an embodiment, operation S810 of starting wireless charging in the first operation mode may include both an operation of starting wireless charging via physical contact and an operation of starting wireless charging without physical contact. According to an embodiment, the first electronic device may be an electronic device transmitting wireless charging. The second electronic device may be an electronic device receiving wireless charging. According to an embodiment, the first operation mode may be an operation mode at a point in time when the first electronic device contacts the second electronic device to start wireless charging. According to an embodiment, the first operation mode may refer to an operation mode before a point in time when the first electronic device may perform stable communication with the second electronic device after the first electronic device contacts the second electronic device. According to an embodiment, an inrush current may be generated due to contact at a point in time when the first electronic device contacts the second electronic device.

In operation S820, a controller may apply a power transmission duty ratio of the first electronic device at a first level. According to an embodiment, the first level may correspond to a lowest power transmission duty ratio. According to an embodiment, the first level may correspond to a power transmission duty ratio having a lowest value, which may be applied. In operation S820, the controller may determine to stably start battery sharing by controlling the power transmission duty ratio of the first electronic device to be applied at the lowest power transmission duty ratio. In other words, a duty ratio of power applied by the first electronic device at a point in time when starting wireless charging may have the lowest value, compared to a duty ratio of power applied after starting wireless charging in the first operation mode or a duty ratio of power applied in a second operation mode. In other words, a duty ratio of power applied by the first electronic device at a point in time when starting wireless charging may have the lowest value, compared to a duty ratio of power applied subsequently.

After applying the power transmission duty ratio of the first electronic device at the first level, in operation S830, the first electronic device monitors a current value for wireless charging. Here, the monitoring of the current value may be sensed via a current sensor included in the first electronic device. The controller may compare the measured current value sensed via the current sensor with a reference current value. For example, the first electronic device may monitor a current it is currently using to provide wireless charging power to the second electronic device, and then measure the current value of this current. For example, the first electronic device may monitor the current using the current sensor 416 and the controller 411.

In operation S840, the power transmission duty ratio may be additionally controlled according to the monitored current value. According to an embodiment, according to the monitored current value, the power transmission duty ratio may be maintained at the first level, or the power transmission duty ratio may be controlled from a second level to an $n^{th}$ level, which are higher than the first level. Here, n may be a natural number greater than or equal to 3. A method of additionally controlling the power transmission duty ratio will be described in detail with reference to FIGS. 9 and 10 below.

Referring to FIG. 9, in operation S910, a power transmission duty ratio of a first electronic device is applied at a lowest level. According to an embodiment, the lowest level may refer to a power transmission duty ratio of 5%. According to some embodiments, the lowest level may include a level at which the power transmission duty ratio is less than 5%.

In operation S920, the power transmission duty ratio is sequentially increased and controlled from the lowest level until reaching a reference current value. According to an embodiment, the controller may control the power transmission duty ratio by adjusting a shift timing. According to an embodiment, the reference current value may be an overcurrent value at which a wireless charging operation of the first electronic device is blocked. According to some embodiments, the reference current value may be an overcurrent value at which the first electronic device is shut down. According to an embodiment, the reference current value may be a current value when the first electronic device does not perform a normal function. The controller may control the power transmission duty ratio while sequentially increasing from the lowest level until reaching the reference current value. In an embodiment, the controller maintains the power transmission duty ratio at a lowest level for a period of time, increases the power transmission duty ratio to a next higher level, maintains the power transmission duty ratio at the next higher level for the period of time, and repeats this until the power transmission duty ratio is at the highest level. According to an embodiment, the controller may compare a value of a current flowing through the first electronic device and sequentially increase the power transmission duty ratio to a range reaching the reference current value, by controlling the power transmission duty ratio with the reference current value.

FIG. 10 is a flowchart illustrating a method of controlling a power transmission duty ratio according to an embodiment.

Referring to FIG. 10, in operation S1010, a controller determines whether or not a current value monitored during control at an $n^{th}$ duty ratio reaches a reference current value. In operation S1030, when the current value monitored during control at the $n^{th}$ duty ratio reaches the reference current value, the controller performs wireless charging while maintaining the $n^{th}$ duty ratio. Subsequently, the controller may change an operation mode from a first operation mode to a second operation mode.

When the monitored current value does not reach the reference current value even though the control at the $n^{th}$ duty ratio is maintained, in operation S1020, the controller additionally controls a duty ratio by changing a shift to an $n+1^{st}$ duty ratio higher than the $n^{th}$ duty ratio. In operation S1040, the controller determines whether or not a current value monitored during control at the $n+1^{st}$ duty ratio reaches the reference current value. When the current value monitored during control at the $n+1^{st}$ duty ratio reaches the reference current value, in operation S1050, the controller performs wireless charging while maintaining the $n+1^{st}$ duty ratio. Subsequently, the controller may change the operation mode from the first operation mode to the second operation mode.

When the monitored current value does not reach the reference current value even though the control at the $n+1^{st}$ duty ratio is maintained, in operation S1060, the controller may additionally control the duty ratio by changing the shift to an $n+2^{nd}$ duty ratio higher than the $n+1^{st}$ duty ratio. According to an embodiment, the $n+1^{st}$ duty ratio is higher than the $n^{th}$ duty ratio and lower than the $n+2^{nd}$ duty ratio. According to an embodiment, an interval between the $n^{th}$ duty ratio and the $n+1^{st}$ duty ratio is equal to an interval between the $n+1^{st}$ duty ratio and the $n+2^{nd}$ duty ratio. Here, n may be a natural number greater than 1. By repeating the above processes, the duty ratio may be additionally controlled until reaching the reference current value, and, when reaching the reference current value, wireless charging may be stabilized while maintaining the duty ratio. Subsequently, an operation may be performed in the second operation mode. According to an embodiment, the first operation mode may refer to a duration during which a duty ratio is controlled from a point in time when wireless charging starts to a point in time when a current in the first electronic device reaches a reference current value.

In the flowchart shown in FIG. 10, the operation of determining whether or not the monitored current value reaches the reference current value may include determining whether or not the monitored current value is equal to the reference current value. According to an embodiment, the operation of determining whether or not the monitored current value reaches the reference current value may include determining whether or not the monitored current value is included within a certain range of the reference current value. According to an embodiment, the operation of determining whether or not the monitored current value reaches the reference current value may include determining that the monitored current value is included within an error range of 5% on the basis of the reference current value. According to an embodiment, when the monitored current value is measured to be included in the error range within 5% of the reference current value even though the monitored current value is measured to be lower than the reference current value, the monitored current value may be determined to reach the reference current value.

According to the inventive concept, provided are an electronic device and a control method capable of decreasing a likelihood that a first electronic device may be affected and forcibly turned off by an inrush current that may be generated when the first electronic device transmitting wireless power starts wireless charging with a second electronic device receiving wireless power. Referring to FIGS. 8 to 10, AC power that is excessively induced at the beginning may be controlled by starting a power transmission duty ratio of the first electronic device at a low value, thereby preventing in advance an overcurrent from flowing. In addition, a ping operation in a transmission mode (a Tx mode) may be stably operated by gradually increasing and controlling a duty ratio until reaching a reference current value while monitoring a value of a current flowing through the first electronic device. Accordingly, an inrush current, which is generated when a capacitor of a reception (Rx) terminal is initially charged, may be controlled, a battery sharing function of a transmission (Tx) terminal may be stabilized, and a possibility of damaging a battery due to an occurrence of an overcurrent may be prevented in advance.

Various operations of the methods described above with reference to FIGS. 8 to 10 may be performed by any suitable means capable of performing operations, such as various types of hardware and/or software implemented in some form of hardware (e.g., a processor, ASIC, or the like).

The software may include an ordered list of executable instructions for implementing logical functions, and may be embedded in any processor-readable medium for use by or in connection with an instruction execution system, apparatus, or device, such as a single or multi-core processor or a processor-including system.

As used herein, the term "storage medium," "computer-readable storage medium," or "non-transitory computer-readable storage medium" may refer to one or more apparatuses for storing data, e.g., apparatuses including ROM, RAM, MRAM, core memory, magnetic disk storage media, optical storage media, flash memory devices, and/or other tangible machine-readable media for storing information. The computer-readable media may include, as non-limiting examples, portable or fixed storage devices, optical storage devices, or various other media capable of storing, including, or carrying instruction(s) and/or data.

Moreover, embodiments may be implemented as hardware, software, firmware, middleware, microcode, hardware description languages (HDLs), or any combination thereof. When the embodiments are implemented as software, firmware, middleware, or microcode, program code or code segments for performing needed tasks may be stored on a machine- or computer-readable medium, such as a computer-readable storage medium. When the embodiments are implemented as software, a processors or processors may be programmed to perform the needed tasks, and thus, may be converted into a specific-purpose processor(s) or computer (s).

As described above, embodiments have been shown in the drawings and description. Although the embodiments have been described by using particular terms herein, the terms are used only for describing the spirit of the inventive concept and are not used to restrict a meaning or limit the scope of the inventive concept defined by the appended claims. While the inventive concept has been particularly shown and described with reference to embodiments thereof, it will be understood that various changes in form and details may be made therein without departing from the spirit and scope of the following claims.

What is claimed is:

1. A method for wirelessly charging an electronic device, the method comprising:

entering, by a first electronic device, a wireless charging mode upon determining that a second electronic device is accessing the first electronic device;

setting, by the first electronic device, a power transmission duty ratio of the first electronic device at a first level;

wirelessly supplying, by the first electronic device, power to the second electronic device at the power transmission duty ratio;

monitoring, by the first electronic device, a current value of the first electronic device used to provide the power to the second electronic device; and controlling, by the first electronic device, the power transmission duty ratio according to a comparison between the monitored current value and a reference current value prestored in the first electronic device.

2. The method of claim 1, wherein the monitoring the current value includes measuring the current value by a current sensor included in the first electronic device.

3. The method of claim 1, wherein the reference current value includes an overcurrent value at which a wireless charging operation of the first electronic device is blocked.

4. The method of claim 2, wherein the controlling the power transmission duty ratio includes controlling the power transmission duty ratio, such that the current value measured by the current sensor included in the first electronic device is maintained to be lower than the reference current value or the same as the reference current value.

5. The method of claim 2, wherein the controlling the power transmission duty ratio includes, when the current value measured by the current sensor included in the first electronic device is included within a preset error range from the reference current value, maintaining and controlling the power transmission duty ratio of the first electronic device at the first level.

6. The method of claim 2, wherein the controlling the power transmission duty ratio includes, when the current value measured by the current sensor included in the first electronic device is less than the reference current value, controlling the power transmission duty ratio of the first electronic device to a second level higher than the first level.

7. The method of claim 6, wherein the controlling the power transmission duty ratio includes, when the current value measured by the current sensor is less than the reference current value after controlling the power transmission duty ratio to the second level, sequentially controlling the power transmission duty ratio of the first electronic device from a third level to an nth level, which are higher than the second level, until the current value measured by the current sensor is included within a preset error range from the reference current value, wherein n is a natural number greater than or equal to 4.

8. The method of claim 1, wherein the first level is lower than a highest power transmission duty ratio supported by the first electronic device.

9. An electronic device configured to wirelessly transmit power to an external electronic device, the electronic device comprising:

a power source;

a transmission coil;

a full bridge circuit electrically connected to the power source and the transmission coil;

a controller configured to communicate with the external electronic device via the transmission coil, and transmit a power signal via the transmission coil by controlling the full bridge circuit; and a current sensor configured to sense a current flowing through the full bridge circuit, wherein the controller is configured to enter a first operation mode to control the full bridge circuit to wirelessly provide the power signal to the external electronic device at a power transmission duty ratio of a first level upon determining that the external electronic device is accessing the electronic device at a first time, and wherein the controller is configured to, upon determining that a current value of the sensed current is less than a reference current value prestored in the controller, increase the power transmission duty ratio of the power signal to a second level higher than the first level at a second time after the first time and then enter a second operation mode.

10. The electronic device of claim 9, wherein the full bridge circuit comprises:

a first switch electrically connected to one end of the transmission coil and turned on in response to a first gate signal of the controller;

a second switch electrically connected to the one end of the transmission coil and turned on in response to a second gate signal of the controller;

a third switch electrically connected to the other end of the transmission coil and turned on in response to a third gate signal of the controller; and a fourth switch electrically connected to the other end of the transmission coil and turned on in response to a fourth gate signal of the controller, wherein the controller is configured to control the power transmission duty ratio of the power signal by shifting switching timings of some of the first gate signal, the second gate signal, the third gate signal, and the fourth gate signal in the first operation mode.

11. The electronic device of claim 10, wherein the controller is configured to, in the first operation mode, control the power transmission duty ratio of the power signal to be at the first level by first shifting switching timings of some of the first to fourth gate signals, and monitor the current value of the electronic device via the current sensor.

12. The electronic device of claim 11, wherein the controller is configured to, in the first operation mode, control the power transmission duty ratio within a range in which the monitored current value does not exceed the reference current value.

13. The electronic device of claim 12, wherein the controller is configured to, in the first operation mode, when the monitored current value is included within a preset error range from the reference current value, maintain and control the first level, and change an operation mode to the second operation mode.

14. The electronic device of claim 12, wherein the controller is configured to, when the monitored current value is included outside a preset error range from the reference current value, control the power transmission duty ratio of the power signal to be at the second level by second shifting switching timings of some of the first to fourth gate signals.

15. The electronic device of claim 14, wherein the controller is configured to, when the monitored current value is included outside the preset error range from the reference current value after controlling the power transmission duty ratio to be at the second level, until the monitored current value is included within the preset error range from the reference current value, sequentially control the power transmission duty ratio of the power signal from a third level to an nth level by third to nth shifting switching timings of some of the first to fourth gate signals, wherein n is a natural number greater than or equal to 4.

16. The electronic device of claim 15, wherein, when the monitored current value is included within the preset error range from the reference current value, the power transmission duty ratio included within the preset error range is maintained and controlled, and the operation mode is changed to the second operation mode.

17. A non-transitory computer-readable medium storing code for wirelessly charging an electronic device, the code comprising instructions executable by a processor to:

enter a wireless charging mode upon determining that the electronic device desires to be charged;

set a power transmission duty ratio to a first level;

wirelessly supply a power signal to the electronic device at the power transmission duty ratio;

monitor a current value of a current used to provide the power signal; and control the power transmission duty ratio according to a comparison between the monitored current value and a reference current value prestored in a device providing the power signal.

18. The non-transitory computer-readable medium of claim 17, wherein the monitor of the current value includes measuring the current value by a current sensor included in the device, wherein the reference current value includes an overcurrent value at which a wireless charging operation of the device configured to transmit the power signal is blocked.

19. The non-transitory computer-readable medium of claim 18, wherein the control of the power transmission duty ratio includes controlling the power transmission duty ratio, such that the current value measured by the current sensor included in the device is maintained to be lower than the reference current value or the same as the reference current value.

20. The non-transitory computer-readable medium of claim 19, wherein the control of the power transmission duty ratio includes, when the current value measured by the current sensor included in the device is less than the reference current value, controlling the power transmission duty ratio of the device configured to transmit the power signal, to be at a second level higher than the first level.

* * * * *